United States Patent
SayyarRodsari et al.

(10) Patent No.: US 11,709,482 B2
(45) Date of Patent: Jul. 25, 2023

(54) SYSTEMS AND METHODS FOR VARIABLE PROCESSING OF STREAMED SENSOR DATA

(71) Applicant: Rockwell Automation Technologies, Inc., Mayfield Heights, OH (US)

(72) Inventors: Bijan SayyarRodsari, Austin, TX (US); Richard W. Arling, Bellevue, WA (US); Wei Dai, Austin, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/410,579

(22) Filed: Aug. 24, 2021

(65) Prior Publication Data
US 2023/0069365 A1    Mar. 2, 2023

(51) Int. Cl.
G05B 19/418    (2006.01)

(52) U.S. Cl.
CPC ..... *G05B 19/4185* (2013.01); *G05B 19/4183* (2013.01); *G05B 19/4188* (2013.01)

(58) Field of Classification Search
CPC ............ G05B 19/4185; G05B 19/4183; G05B 19/4188
See application file for complete search history.

(56) References Cited

U.S. PATENT DOCUMENTS

| | | | | |
|---|---|---|---|---|
| 2005/0197806 A1* | 9/2005 | Eryurek | ............. | G05B 23/0221 702/188 |
| 2006/0224254 A1* | 10/2006 | Rumi | ................. | G05B 13/0275 700/28 |
| 2008/0150714 A1* | 6/2008 | Bauer | ...................... | H04Q 9/00 340/539.22 |
| 2009/0119243 A1* | 5/2009 | Yuan | ...................... | G06N 7/005 706/52 |

(Continued)

FOREIGN PATENT DOCUMENTS

| | | |
|---|---|---|
| EP | 3798778 A1 | 3/2021 |
| WO | 2018195488 A1 | 10/2018 |

OTHER PUBLICATIONS

European Search Report; EP Application No. EP 22189718; dated Jan. 19, 2023.

*Primary Examiner* — Christopher E. Everett
(74) *Attorney, Agent, or Firm* — Fletcher Yoder, PC

(57) ABSTRACT

A system may include sensor device comprising a sensor configured to measure sensor data indicating an operational parameter of industrial automation equipment associated with an industrial automation process. The system may also include communication circuitry configured to transmit the sensor data. Additionally, the system includes a processor configured to receive the sensor data. Further, the system includes a non-transitory computer-readable medium comprising computer-executable instructions that, when executed, are configured to cause the processor to perform (Continued)

operations including identifying an operational state of the industrial automation equipment based on the sensor data. The operations may also include determining a discrepancy between the sensor data and the operational state. Further, the operations may include modifying an operation of the processor from a first operational mode to a second operational mode of a plurality of operational based on the comparison.

18 Claims, 6 Drawing Sheets

(56) References Cited

U.S. PATENT DOCUMENTS

| | | | |
|---|---|---|---|
| 2011/0092164 A1* | 4/2011 | Spanhake | H04Q 9/00 |
| | | | 455/67.11 |
| 2015/0050902 A1* | 2/2015 | Umeki | H04Q 9/00 |
| | | | 455/127.5 |
| 2016/0098037 A1* | 4/2016 | Zornio | G05B 19/4185 |
| | | | 700/20 |
| 2018/0081328 A1* | 3/2018 | Lu | G05B 13/04 |

* cited by examiner

SYSTEMS AND METHODS FOR VARIABLE PROCESSING OF STREAMED SENSOR DATA

BACKGROUND

The present disclosure generally relates to control systems and, more particularly, to control systems using sensors that stream data.

Generally, a control system may facilitate performance of an industrial automation process by controlling operation of one or more automation devices. For example, to facilitate performing an industrial automation process, the control system may determine a control action and instruct an automation device (e.g., a rod-pump) to perform the control action. Additionally, the control system may facilitate monitoring performance of the process to determine whether the process is operating as desired. When not operating as desired, the control system may also perform diagnostics on the process to determine cause of undesired operation.

In some instances, the control system may utilize data obtained by sensors to determine control actions to implement using the one or more automation devices to control the industrial automation process. For example, the control system may process the sensor data acquired by multiple sensors and generate a model that is used to determine the control actions. However, generating the model is a relatively time consuming process. As such, it may be desirable to provide improve systems and methods for processing the sensor data prior to batch processing the sensor data in real time or near real time to efficiently monitor the performance of the industrial automation system and increase the efficiency in which the industrial automation system operates.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system. The system may include sensor device comprising a sensor configured to measure sensor data indicating an operational parameter of industrial automation equipment associated with an industrial automation process. The system may also include communication circuitry configured to transmit the sensor data. Additionally, the system includes a processor configured to receive the sensor data. Further, the system includes a non-transitory computer-readable medium comprising computer-executable instructions that, when executed, are configured to cause the processor to perform operations including identifying an operational state of the industrial automation equipment based on the sensor data. The operations may also include determining a discrepancy between the sensor data and the operational state. Further, the operations may include modifying an operation of the processor from a first operational mode to a second operational mode of a plurality of operational based on the comparison.

In another embodiment, the present disclosure relates to a non-transitory computer-readable medium comprising computer-executable instructions that, when executed, are configured to cause a processor to perform operations including receiving sensor data indicating an operational parameter of industrial automation equipment associated with an industrial automation process. The operations also include determining a discrepancy between the sensor data and one or more operational states associated with the industrial automation equipment. Further, the operations include modifying an operation of the processor from a first operational mode to a second operational mode of a plurality of operational based on the discrepancy.

In yet another embodiment, the present disclosure relates to a method. The method includes receiving, via a processor, sensor data indicating an operational parameter of industrial automation equipment associated with an industrial automation process. The method also includes determining, via the processor, an operational state of the industrial automation equipment based on the sensor data. Further, the method includes determining, via the processor, a discrepancy between the sensor data and the operational state. Further still, the method includes modifying, via the processor, an operation of the processor from a first operational mode to a second operational mode of a plurality of operational based on the discrepancy.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
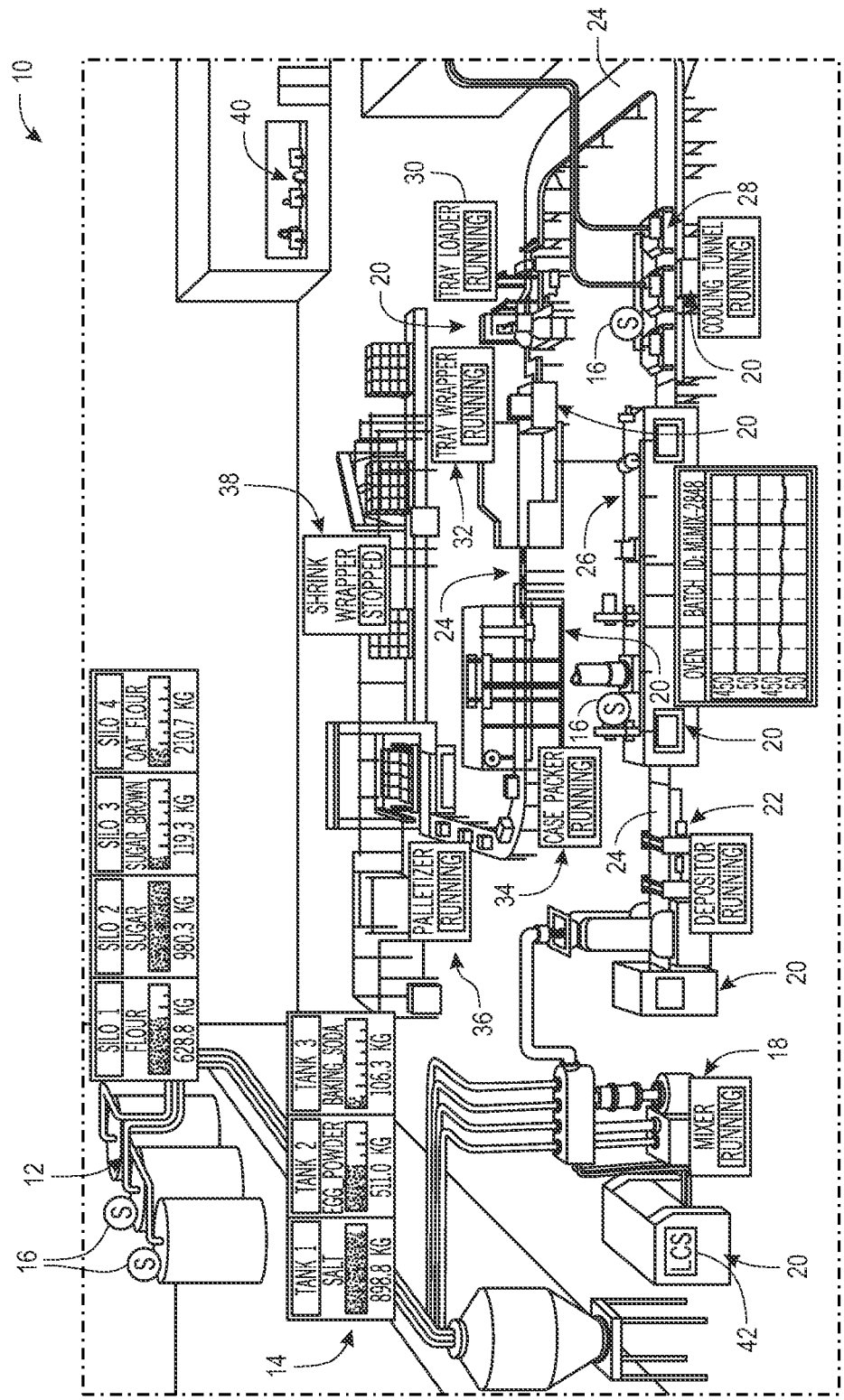
FIG. 1 illustrates an example industrial automation system employed by a food manufacturer, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a control system may control one or more operations of one or more automation devices to facilitate performing an industrial automation process. Industrial automation processes may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a control system may control load and position of a rod pump (e.g., an automation device) to perform an oil extraction process. Although examples are provided with regard to specific contexts, one of ordinary skill in the art will recognize that these examples are not intended to be limiting and that the techniques described herein can be used with any suitable context.

To improve operation, the control system may monitor performance of the one or more automation devices and/or the industrial automation process as a whole. For example, the control system may include sensors that measure process data and provide the process data as input to a process model to determine control actions (e.g., control signals) that are used to control operation of the industrial automation process. As used herein, "process data" is intended to describe data indicative of operation of an industrial automation process. For example, the process data may include inputs to the industrial automation process (e.g., process input data), outputs from the industrial automation process (e.g., process output data), disturbance variables (e.g., environmental conditions), constraints on operation, operational parameters (e.g., temperature, speed, load, position, voltage, and/or pressure) of an automation device, and the like.

As mentioned above, a control system may monitor or control the one or more industrial automation devices using a model generated using sensor data measured by sensors. For example, the control system may generate the model by batch processing the sensor data acquired by a number of sensors. As used herein, "batch processing" is intended to describe receiving a batch or collection of information from different related sources (e.g., sensors in a particular portion of the industrial system) and processing the batch of information. In the context of controlling an industrial automation process, the control system may receive sensor data from multiple sensors, store the batch sensor data (e.g., the received data from each of the multiple sources) in a memory, access historical data associated with the sensors, and identify trends and determine control actions to implement using the stored sensor data and the historical data, thereby batch processing the data. In general, batch processing may utilize a relatively large amount of processing capabilities and memory as compared to processing data individually or serially, and thus utilize a relatively large amount of CPU power. As such, batch processing may be performed by computing device that is separate from the sensors using the larger processing capabilities of the computing device. It is presently recognized that it may be advantageous to utilize smart sensor devices that includes sensor components along with certain processing components that may enable the smart sensor devices to process streamed sensor data or sensor data received at real-time (e.g., within microseconds) or near real-time.

Accordingly, the present disclosure is directed to systems and methods for smart sensor devices capable of processing streamed sensor data. In general, the processing components of the smart sensor devices may employ a learning algorithm (e.g., artificial intelligence (AI), machine learning, and the like) that is capable of performing certain for operations such as anomaly detection, preventative maintenance, diagnostics, sensor data validation, and the like. For example, the processing components may be capable of identifying an expected operational state of the one or more industrial automation devices and/or the industrial automation system based on sensor data acquired by a sensor of the smart sensor devices. In general, the identified expected operational state may be indicated by expected operational parameters, such as when an industrial automation device is not operating in an anomalous manner. Using the identified expected operational state, the processing components of the smart sensor device may be capable of adjusting operational modes of the smart sensor device when sensor data indicates that the operational state of an industrial automation device deviates from the identified expected operational state. More specifically, the processing components may toggle between multiple operational modes that correspond to varying levels of processing.

As one non-limiting example of how the smart sensor device may adjust operational modes, the smart sensor device may toggle between a first operational mode that causes the smart sensor device to detect an unexpected change in sensor data, such as an anomaly, and output control signals to correct to anomaly, and a second operational mode that causes the smart sensor device to identify and/or determine operating conditions associated with the anomaly (e.g., an anomaly learning mode). As used herein, an "anomaly" corresponds to a deviation from existing or expected operation conditions, such as when operating conditions change above a predetermined threshold. In general, the first operational mode may be less computationally intensive (e.g., samples data at a lower rate, performs fewer operations on the sensor data) than the second operational mode. Furthermore, the smart sensor device may be capable of implementing a third operational mode that enables the smart sensor device to determine a constraint (e.g., a relationship between sensor data streams from additional smart sensor devices) that may be used to detect anomalies or for automated sensor validation, such as determining when a sensor is not operating as expected (e.g., a sensor is offline, not transmitting data, transmitting unexpected data).

While the discussion above relates to anomaly detection, the smart sensor devices may also be capable of performing other operations using the processor of the smart sensor devices, rather than batch processing sensor data with a separate control system. For example, and as described in more detail with respect to FIG. 5, the smart device may be capable of programmatically activating a more complex operational mode during preventative maintenance operations associated with industrial automation equipment or devices. Further still, and as described in more detail with respect to FIG. 6, the smart device may be capable of programmatically activating a more complex operational mode based on a diagnosed condition of the industrial automation equipment or devices. Even further, and as described in more detail with respect to FIG. 9, the smart device may be capable of performing sensor data validation.

The differences in the number of computational tasks performed with the operational modes may correspond to varying levels of CPU power (e.g., the first operational mode may utilize less CPU power as compared to the second operational mode). In this way, the smart sensor device may toggle between operational modes (e.g., the second operational mode) to reduce under certain conditions thereby increasing the lifetime of the sensor. For example, while implementing the second operational mode, the smart sensor device may determine when to transmit data, such as based on a frequency associated with an anomaly or change in the data, which may reduce the power utilized by the smart sensor device. Further, while implementing the third operational mode, the smart sensor device may determine a constraint (e.g., a determined relationship or criteria), which may be used to detect anomalies. As such, the smart sensor device may be capable of identifying certain errors associated with the industrial automation equipment without batch processing by a separate control system. At least in some instances, the smart sensor device may transmit information indicating the frequency associated with the anomaly to additional smart sensor devices (e.g., via a control system) thereby causing the additional smart sensor devices to transmit additional sensor data that may be used for certain processing operations. The control system may then determine a reduced set of data and output a control signal that causes the smart sensor devices to modify the amount of data measured by the sensor of the smart sensor devices and transmitted. In this way, the smart sensor devices may reduce the amount of sensor data that is processed (e.g., batch processed) by the control system thereby enabling the control system to determine control actions more quickly. Additionally, the smart sensor devices may include processing capabilities that enable the smart sensor devices to control operational modes corresponding to different levels of processing complexity using measured sensor data to improve the lifetime of the smart sensor devices. Furthermore, the smart sensor devices may include processing capabilities that enable the smart sensor devices to determine what data is more relevant to an anomaly and transmit the more relevant data, rather than transmitting data indiscriminately (e.g., transmitting all data).

As such, the smart sensor device is capable of monitoring and causing adjustments in the operation of one or more industrial automation devices, and thus, offloading certain processing operations that may be performed by an external processor unit (e.g., that may batch process data from multiple sensors). In this way, the smart sensor devices may reduce the amount of processing performed by the control system, and thus enable the control system to identify conditions associated with anomalies more quickly.

By way of introduction, FIG. 1 illustrates an example industrial automation system 10 employed by a food manufacturer. The present embodiments described herein may be implemented using the various devices illustrated in the industrial automation system 10 described below. However, it should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals, and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials may be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

Figure 2:
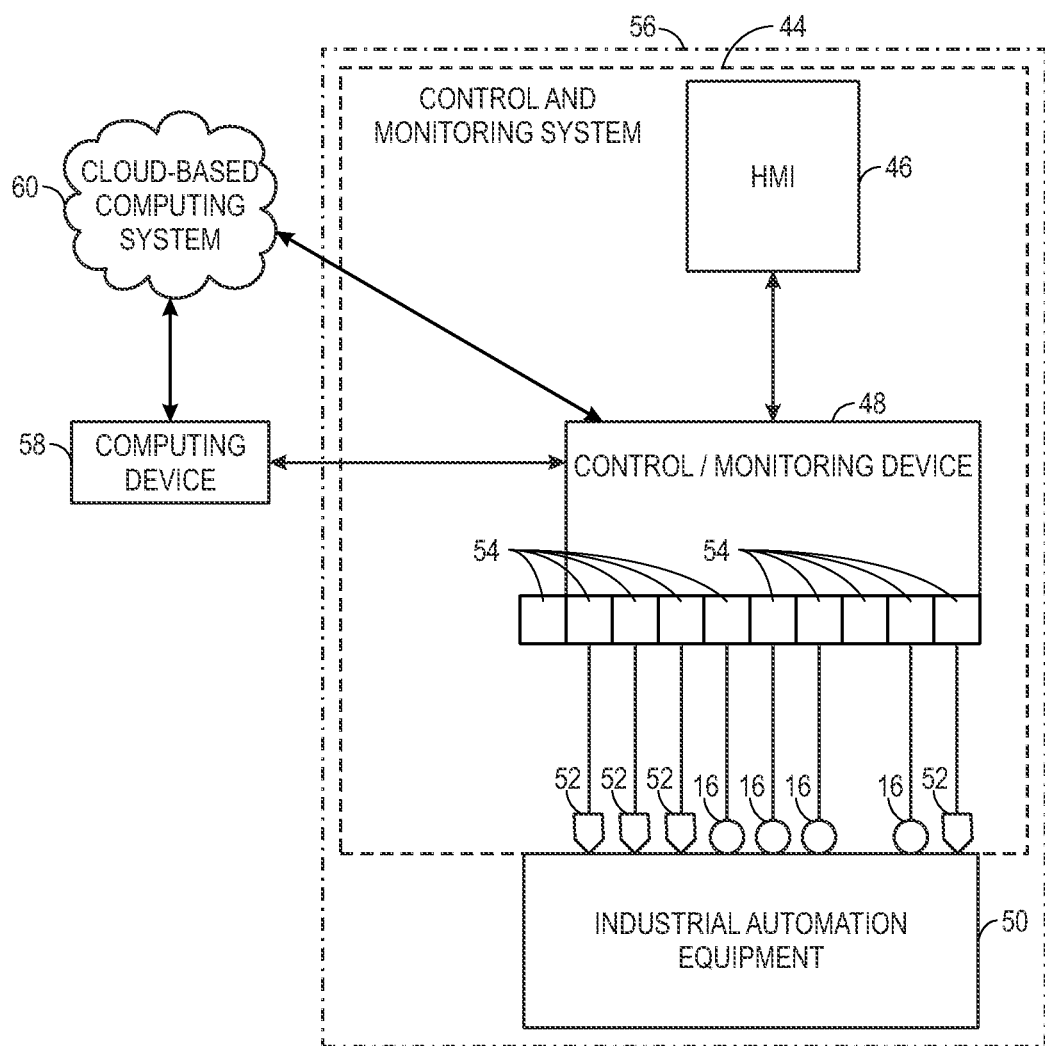
FIG. 2 illustrates a diagrammatical representation of an exemplary control and monitoring system that may be employed in any suitable industrial automation system, in accordance with an embodiment.

By way of example, FIG. 2 illustrates a diagrammatical representation of an exemplary local control system 42 that may be employed in any suitable industrial automation system 10, in accordance with embodiments presented herein. In FIG. 2, the local control system 42 is illustrated as including a human machine interface (HMI) 46 and a control/monitoring device 48 or automation controller adapted to interface with devices that may monitor and control various types of industrial automation equipment 50. By way of example, the industrial automation equipment 50 may include the mixer 18, the depositor 22, the conveyor 24, the oven 26, other pieces of machinery described in FIG. 1, or any other suitable equipment.

It should be noted that the HMI 46 and the control/monitoring device 48, in accordance with embodiments of the present techniques, may be facilitated by the use of certain network strategies. Indeed, any suitable industry standard network or network may be employed, such as DeviceNet, to enable data transfer. Such networks permit the exchange of data in accordance with a predefined protocol and may provide power for operation of networked elements.

As discussed above, the industrial automation equipment 50 may take many forms and include devices for accomplishing many different and varied purposes. For example, the industrial automation equipment 50 may include machinery used to perform various operations in a compressor station, an oil refinery, a batch operation for making food items, a mechanized assembly line, and so forth. Accordingly, the industrial automation equipment 50 may comprise a variety of operational components, such as electric motors, valves, actuators, temperature elements, pressure sensors, or a myriad of machinery or devices used for manufacturing, processing, material handling, and other applications.

Additionally, the industrial automation equipment 50 may include various types of equipment that may be used to perform the various operations that may be part of an industrial application. For instance, the industrial automation equipment 50 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 50 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.), and the like.

In certain embodiments, one or more properties of the industrial automation equipment 50 may be monitored and controlled by certain equipment for regulating control variables used to operate the industrial automation equipment 50. For example, the sensors 16 and actuators 52 may monitor various properties of the industrial automation equipment 50 and may provide data to the local control system 42, which may adjust operations of the industrial automation equipment 50, respectively.

In some cases, the industrial automation equipment 50 may be associated with devices used by other equipment. For instance, scanners, gauges, valves, flow meters, and the like may be disposed on industrial automation equipment 50. Here, the industrial automation equipment 50 may receive data from the associated devices and use the data to perform their respective operations more efficiently. For example, a controller (e.g., control/monitoring device 48) of a motor drive may receive data regarding a temperature of a connected motor and may adjust operations of the motor drive based on the data.

In certain embodiments, the industrial automation equipment 50 may include a communication component that enables the industrial equipment 50 to communicate data between each other and other devices. The communication component may include a network interface that may enable the industrial automation equipment 50 to communicate via various protocols such as Ethernet/IP®, ControlNet®, DeviceNet®, or any other industrial communication network protocol. Alternatively, the communication component may enable the industrial automation equipment 50 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 52 may include any number of devices adapted to perform a mechanical action in response to a signal from a controller (e.g., the control/monitoring device 48). The sensors 16 and actuators 52 may be utilized to operate the industrial automation equipment 50. Indeed, they may be utilized within process loops that are monitored and controlled by the control/monitoring device 48 and/or the HMI 46. Such a process loop may be activated based on process input data (e.g., input from a sensor 16) or direct operator input received through the HMI 46. As illustrated, the sensors 16 and actuators 52 are in communication with the control/monitoring device 48. Further, the sensors 16 and actuators 52 may be assigned a particular address in the control/monitoring device 48 and receive power from the control/monitoring device 48 or attached modules.

Input/output (I/O) modules 54 may be added or removed from the control and monitoring system 44 via expansion slots, bays or other suitable mechanisms. In certain embodiments, the I/O modules 54 may be included to add functionality to the control/monitoring device 48, or to accommodate additional process features. For instance, the I/O modules 54 may communicate with new sensors 16 or actuators 52 added to monitor and control the industrial automation equipment 50. It should be noted that the I/O modules 54 may communicate directly to sensors 16 or actuators 52 through hardwired connections or may communicate through wired or wireless sensor networks, such as Hart or IOLink.

Generally, the I/O modules 54 serve as an electrical interface to the control/monitoring device 48 and may be located proximate or remote from the control/monitoring device 48, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE702.3, TCP/IP, UDP, Ethernet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 54 may transfer input and output signals between the control/monitoring device 48 and the industrial automation equipment 50. As illustrated, the sensors 16 and actuators 52 may communicate with the control/monitoring device 48 via one or more of the I/O modules 54 coupled to the control/monitoring device 48.

In certain embodiments, the control/monitoring system 44 (e.g., the HMI 46, the control/monitoring device 48, the sensors 16, the actuators 52, the I/O modules 54) and the industrial automation equipment 50 may make up an industrial automation application 56. The industrial automation application 56 may involve any type of industrial process or system used to manufacture, produce, process, or package various types of items. For example, the industrial applications 56 may include industries such as material handling, packaging industries, manufacturing, processing, batch processing, the example industrial automation system 10 of FIG. 1, and the like.

In certain embodiments, the control/monitoring device 48 may be communicatively coupled to a computing device 58 and a cloud-based computing system 60. In this network, input and output signals generated from the control/monitoring device 48 may be communicated between the computing device 58 and the cloud-based computing system 60. Although the control/monitoring device 48 may be capable of communicating with the computing device 58 and the cloud-based computing system 60, as mentioned above, in certain embodiments, the control/monitoring device 48 (e.g., local computing system 42) may perform certain operations and analysis without sending data to the computing device 58 or the cloud-based computing system 60.

As discussed herein, it may be advantageous to process the streamed sensor data, such as sensor data acquired by the sensors 16. For example, processing the streamed sensor data (e.g., before sending the streamed sensor data to the control/monitoring device 48) may reduce the batch data that is processed by the control/monitoring device 48, and thus may enable the control/monitoring device 48 to more quickly determine control actions for controlling the industrial automation system 10. For example, the sensors 16 may be included within a smart sensor device 62, which may include a processor that is capable of processing certain volumes of sensor data, such as streamed sensor data. As discussed in more detail herein, the smart sensor device 62 may be capable of toggling or switching between different levels of processing based on the operational parameters, where each level may include a relatively more complex processing algorithm. The relatively more complex processing algorithms may utilize more power, and thus, a smarting sensing device 16 capable of toggling between different levels of processing may have improved battery life. That is, the smart sensor device 16 may toggle to a first level of processing (from a second level of processing that is relatively less complex than the first level of processing when the a number of analysis operations exceeds a threshold, a threshold amount of processing power is expected to be used, or the like.

Figure 3:
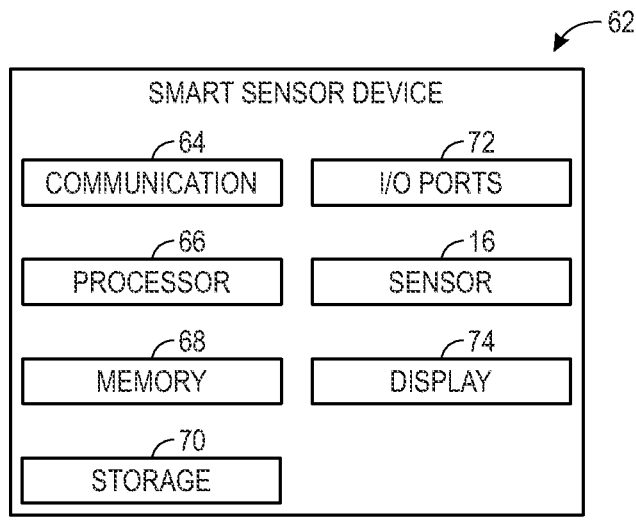
FIG. 3 illustrates example components that may be part of a smart sensor device that may be implemented in the industrial automation system, in accordance with an embodiment.

For example, FIG. 3 illustrates example components that may be part of the smart sensor device 62 or any other suitable computing device that implement embodiments presented herein. For example, the smart sensor device 62 may include a communication component 64 (e.g., communication circuitry), a processor 66, a memory 68, a storage 70, input/output (I/O) ports 72, a sensor 16 (e.g., an electronic data sensor, a temperature sensor, a vibration sensor, a camera), a display 74, and the like. The communication component 64 may be a wireless or wired communication component that may facilitate communication between the smart sensor device 62, additional smart sensor device 62, the control/monitoring device 48, and other communication capable devices. In general, the control/monitoring device 48 may include generally similar components as the smart sensor device 62. However, the control/monitoring device 48 may not include a sensor and the processor of the control/monitoring device 48 may be capable of processing relatively more data that the processor 66.

The processor 66 may be any type of computer processor or microprocessor capable of executing computer-executable code. The processor 66 may also include multiple processors that may perform the operations described below. The memory 68 and the storage 70 may be any suitable articles of manufacture that can serve as media to store processor-executable code, data, or the like. These articles of manufacture may represent computer-readable media (e.g., any suitable form of memory or storage) that may store the processor-executable code used by the processor 66 to perform the presently disclosed techniques. Generally, the processor 66 may execute software applications that include identifying anomalies in sensor data measured by the sensor 16, identifying a frequency corresponding to a change in the sensor data, determining a reduced set of sensor data, and generating constraints used to validate the sensor data, as discussed in more detail with respect to FIGS. 4-7.

The memory 68 and the storage 70 may also be used to store the data, analysis of the data, the software applications, and the like. For example, the memory 68 and the storage 70 may store instructions associated with implementing different levels of processing for various operations. As another non-limiting example, the memory 68 and the storage 70 may store one or more previously acquired sensor data (e.g., by the sensor 16 of the smart sensor device 62) or streamed sensor data from an additional smart sensor device 62. As another non-limiting example, the memory 68 and the storage 70 may store a constraint that represents a relationship between sensor data acquired by the sensor 16 and streamed sensor data from one or more additional smart sensor devices, as discussed in more detail with respect to FIG. 7. The memory 68 and the storage 70 may represent non-transitory computer-readable media (e.g., any suitable form of memory or storage) that may store the processor-executable code used by the processor 66 to perform various techniques described herein. It should be noted that non-transitory merely indicates that the media is tangible and not a signal.

The I/O ports 72 may be interfaces that may couple to other peripheral components such as input devices (e.g., keyboard, mouse), sensors, input/output (I/O) modules, and the like. The I/O modules may enable the smart sensor device 62 to communicate with the computing device 58, the control/monitoring device 48, the industrial automation equipment 50, or other devices in the industrial automation system via the I/O modules.

The display 74 may depict visualizations associated with software or executable code being processed by the processor 66. In one embodiment, the display 74 may be a touch display capable of receiving inputs (e.g., parameter data for operating the industrial automation equipment 50) from a user of the smart sensor device 62, such as an indication indicating that the smart sensor device 62 should toggle to a different level of processing. As such, the display 74 may serve as a user interface to communicate with smart sensor device 62. The display 74 may display a graphical user interface (GUI) for operating the smart sensor device 62, for tracking the maintenance of the industrial automation equipment 50, and the like. The display 74 may be any suitable type of display, such as a liquid crystal display (LCD), plasma display, or an organic light emitting diode (OLED) display, for example. Additionally, in one embodiment, the display 74 may be provided in conjunction with a touch-sensitive mechanism (e.g., a touch screen) that may function as part of a control interface for the smart sensor device 62 or for a number of pieces of industrial automation equipment in the industrial automation application 56, to control the general operations of the industrial automation application 56.

Although the components described above have been discussed with regard to the control/monitoring device 48 and the local control system 42, it should be noted that similar components may make up other computing devices described herein. Further, it should be noted that the listed components are provided as example components and the embodiments described herein are not to be limited to the components described with reference to FIG. 3. For example, the control/monitoring device 48 and the local control system 42 may include the communication component 64, the processor 66, the memory 68, the storage 70, the I/O ports 72, and the display 74. However, in general, the processor 66 of the control/monitoring device 48 may be capable of processing relatively more data than the processor 66 of the smart sensor device 62. For example, the processor 66 of the control/monitoring device 48 may be capable of batch processing, while the processor 66 of the smart sensor device 62 may be capable of processing streamed sensor data.

Keeping the foregoing in mind, in some embodiments, the memory 68 and/or storage 70 of the computing device 58 may include a software application that may be executed by the processor 66 and may be used to monitor, control, access, or view one of the industrial automation equipment 50. As such, the computing device 58 may communicatively couple to industrial automation equipment 50 or to a respective computing device of the industrial automation equipment 50 via a direct connection between the devices or via the cloud-based computing system 60. The software application may perform various functionalities, such as track statistics of the industrial automation equipment 50, store reasons for placing the industrial automation equipment 50 offline, determine reasons for placing the industrial automation equipment 50 offline, secure industrial automation equipment 50 that is offline, deny access to place an offline industrial automation equipment 50 back online until certain conditions are met, and so forth.

As another non-limiting example, and referring back to FIG. 2, in operation, the industrial automation application 56 may receive one or more process inputs to produce one or more process outputs. For example, the process inputs may include feedstock, electrical energy, fuel, parts, assemblies, sub-assemblies, operational parameters (e.g., sensor measurements), or any combination thereof. Additionally, the process outputs may include finished products, semi-finished products, assemblies, manufacturing products, by products, or any combination thereof.

To produce the processed outputs, the control/monitoring device 48 may output control signals to instruct industrial automation equipment 50 to perform a control action. For example, the control/monitoring device 48 may instruct a motor (e.g., an automation device 20) to implement a control action to cause the motor to operate at a particular operating speed (e.g., a manipulated variable set point).

In some embodiments, the control/monitoring device 48 may determine the manipulated variable set points based at least in part on process data. As described above, the process data may be indicative of operation of the industrial automation device 20, the industrial automation equipment 50, the industrial automation application 56, and the like. As such, the process data may include operational parameters of the industrial automation device 20 and/or operational parameters of the industrial automation application 65. For example, the operational parameters may include any suitable type of measurement or control setting related to operating respective equipment, such as temperature, flow rate, electrical power, and the like. In some embodiments, the process data may be acquired from the smart sensors 62 and may include an aggregation of data acquired by multiple smart sensor device 62.

Thus, the control/monitoring device 48 may receive process data from one or more of the industrial automation devices 20, the smart sensor device 62, the sensors 16, or the like. In some embodiments, the smart sensor device 62 may determine an operational parameter and communicate a measurement signal indicating the operational parameter to the control/monitoring device 48 when the operational parameter is above a threshold (e.g., as discussed in more detail with respect to FIG. 4), in accordance with a frequency of the operational parameter occurring (e.g., as discussed in more detail with respect to FIG. 7), and the like. For example, a temperature sensor may measure a temperature of a motor (e.g., an automation device 20) and transmit a measurement signal indicating the measured temperature to the control/monitoring device 48. The control/monitoring device 48 may then analyze process data associated with the operation of the motor to monitor performance of an associated industrial automation application 56 (e.g., determine an expected operational state) and/or perform diagnostics on the industrial automation application 56 based on the measured temperature.

To facilitate controlling operation and/or performing other functions, the control/monitoring device 48 may include one or more controllers, such as one or more model predictive control (MPC) controllers, one or more proportional-integral-derivative (PID) controllers, one or more neural network controllers, one or more fuzzy logic controllers, and other suitable controllers.

In some embodiments, the supervisory control system 40 may provide centralized control over operation of the industrial automation application 56. For example, the supervisory control system 40 may enable centralized communication with a user (e.g., operator). To facilitate, the supervisory control system 40 may include the display 74 to provide information to the user. For example, the display 74 may present visual representations of information, such as process data, selected features, expected operational parameters, and/or relationships there between. Additionally, the supervisory control system 40 may include similar components as the control/monitoring device 48 described above in FIG. 3.

On the other hand, the control/monitoring device 48 may provide localized control over a portion of the industrial automation application 56. For example, in the depicted embodiment of FIG. 1, the local control system 42 that may be part of the mixer 18 may include the control/monitoring device 48, which may provide control over operation of a first automation device 20 that controls the mixer 18, while a second local control system 42 may provide control over operation of a second automation device 20 that controls the operation of the depositor 22.

In some embodiments, the local control system 42 may control operation of a portion of the industrial automation application 56 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

As discussed herein, the smart sensor device 62 may be capable of toggling between different operational modes that correspond to different or varying levels of processing to provide a level of processing suitable for handling different operations. For example, the smart sensor device 62 may operate in a default mode (e.g., a relatively less complex algorithm) that enables the smart sensor device 62 to detect changes in received sensor data (e.g., obtained by sensor 16 of the smart sensor device 62). When the detected change correspond to known conditions or anomalies, the smart sensor device 62 may implement a corrective action as discussed in more detail below with respect to FIG. 4. However, if the detected change in the received sensor data does not correspond to a known anomaly (e.g., a known condition), the smart sensor device 62 may toggle a relatively more complex algorithm (e.g., an anomaly learning mode) that provides a level of processing suitable for identifying and remedy future occurrences of a new anomaly. As discussed in more detail herein, in addition to detecting anomalies, smart sensor device 62 may be capable of performing diagnostics (e.g., by additionally identifying the anomaly type), or enabling predictive diagnostics (e.g., by detecting the onset of an anomaly and providing advance notice to that effect) in the sensor data by comparing the received sensor data to a constraint or by processing the streaming sensor data to determine whether a new state of operation is reached and to further identify the newly detected state and trigger the appropriate course of action corresponding to the identified state. With the ability to programmatically activate the execution of the more complex algorithm based on the respective operations, the energy usage by the smart sensor device 62 may be decreased and the life expectancy of the sensor device will be extended.

Figure 4:
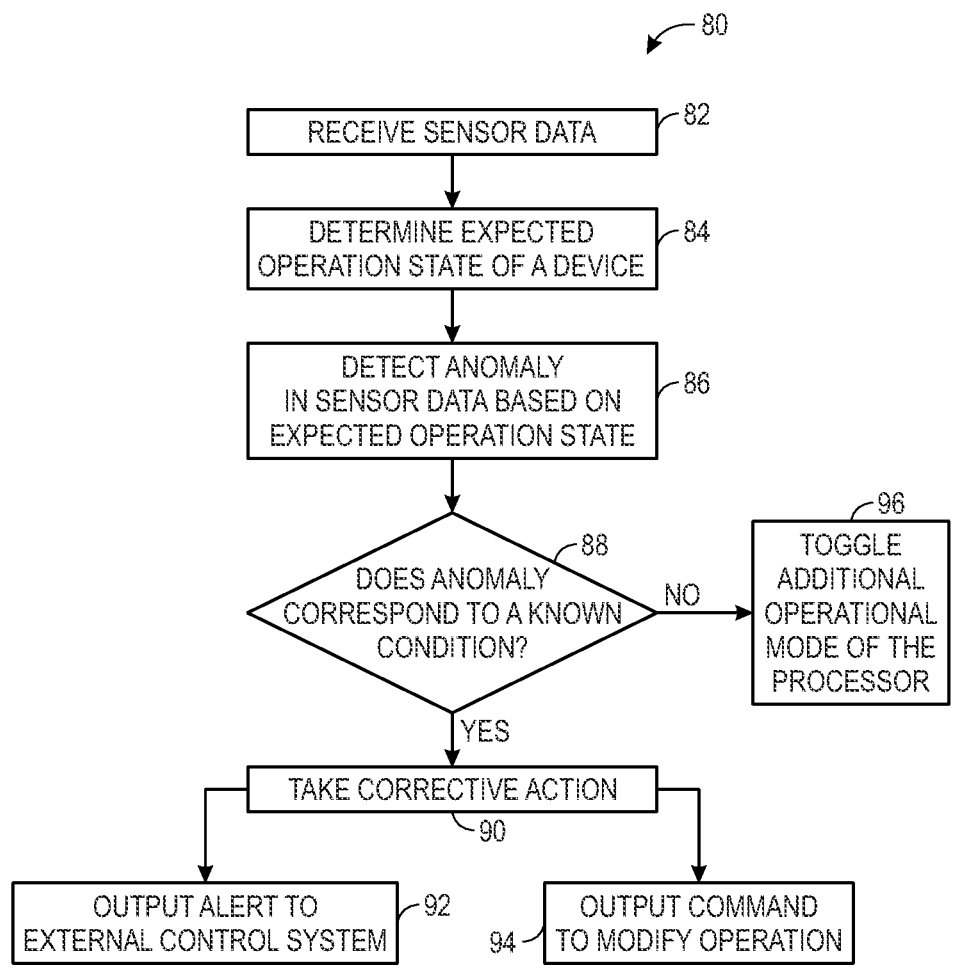
FIG. 4 illustrates a flow chart of a method for toggling between processing modes to control operation of smart sensor monitoring parameters of the industrial automation system, in accordance with an embodiment.

To illustrate this, FIG. 4 illustrates a flowchart of a method 80 that may be implemented by a processor of the smart sensor device 62 for selectively toggling between different operational modes based on a detected anomaly. The method 80 described below generally illustrates toggling between an anomaly identification mode (e.g., a relatively less complex algorithm) and an anomaly learning mode (e.g. a relatively more complex algorithm).

Although the method 80 is described as being performed by the processor 66 of the smart sensor device 62, it should be noted that any suitable computer device capable of communicating with other components in the industrial automation system 10 may perform the disclosed method 80 including, but not limited to, the cloud-based computing system 60, the computing device 58, and the like. However, it should be noted that employing the method 80 described below in the smart sensor device 62, the control and monitoring system 44, the cloud-based computing system 60, the computing device 58, and other computing devices connected to the smart sensor device 62 may transmit data or analyzed data in a controlled or limited manner. That is, the present embodiments described herein defer some processing operations traditionally performed via devices connected to the smart sensor device 62. As a result, the smart sensor device 62 may communicate data less frequently than previous methodologies in which the connected devices receive data from sensors at regular intervals and perform more processing operations for analyzing the collected data, while the sensors lack or have limited processing capabilities. By performing the methods described below, the present embodiments preserve network bandwidth in the industrial automation system 10 for data that the smart sensor devices 62 has processed, thereby reducing the frequency in which raw data is transmitted across the network. Moreover, the connected devices use less processing power because the smart sensor devices 62 perform some of the processing, thereby distributing the processing operations across multiple devices.

Referring now to FIG. 4, at block 82, the smart sensor device 62 may receive sensor data. For example, the processor 66 of the smart sensor device 62 may receive sensor data acquired, measured, or detected by the sensor 16 of the smart sensor device 62. In general, the sensor data is indicative of operational parameters (e.g., a temperature, an operating speed, a mass, a volume, and a type of material being processed, a pressure, a humidity level, a voltage, and the like.) At least in some instances, and as discussed in more detail with regard to FIG. 7, the processor 66 of the smart sensor device 62 may receive the sensor data via a communication component 64 of another smart sensor device 62.

At block 84, the smart sensor device 62 may determine an expected operational state of an industrial automation device or equipment using the received sensor data. In general, to determine the expected operational state, the smart sensor device 62 may determine a root mean square (RMS) of streamed sensor data, determine a mean of sensor data, determine a standard deviation of sensor data, cluster streamed sensor data, and/or performing multi-dimensional binning. For example, the smart sensor device 62 may determine a mean of sensor data as the sensor data is acquired by the sensor of the smart sensor device 62 for a time period or amount of data. Once the mean is determined, the smart sensor device 62 may store the mean in the memory 68 of the smart sensor device 62 to compare with subsequently received sensor data. At least in some instances, the smart sensor device 62 may determine a constraint associated with the expected sensor data and/or expected operational state. In general, the constraint indicates an expected range or threshold of expected sensor data associated with the expected operational state. In some embodiments, the constraint may be provided via a user input. In some embodiments, and as discussed in more detail with respect to FIG. 7, the constraint may be determined by the smart sensor device 62 based on data received from one or more sensor devices. In any case, the constraint and/or data indicating the expected operational state of an industrial automation equipment or device may be stored in the memory 68, storage 70, or in a cloud storage accessible by the smart sensor device 62. In some embodiments, the smart sensor 62 may output a notification to a user regarding the identified operating state. The notification may include selectable features to enable the user to provide an input, such as labels indicating the operating state or other operating states identified by the smart sensor device 62 (e.g., which may be used in identifying subsequent operating states by the smart sensor device 62). The user input and/or labels may be provided from an enterprise software, from a computing device of the user, and the like. By receiving labels and/or feedback regarding the identified operating state, the classifications by the smart sensor device 62 may be verified or rejected thereby improving the accuracy of the operational state detection.

At block 86, the smart sensor device 62 may identify or detect an anomaly in the sensor data using the expected operational state and/or constraint of the industrial automation equipment or device. In general, the smart sensor device 62 may receive sensor data in a similar manner as described above with respect to block 82 and identify the anomaly in the received sensor data (e.g., subsequently received sensor data). For example, the constraint may be a threshold or threshold range indicating expected operational parameters. As such, the smart sensor device 62 may detect an anomaly when the sensor data exceeds the threshold or falls outside the threshold range. At least in some instances, the smart sensor device 62 (e.g., via the processor 66) may compare a received sensor data point to a threshold value determined based on one or more previously received sensor data points that are stored in the memory 68 of the smart sensor device 62. If the received sensor data point exceeds the threshold value, then the smart sensor device 62 may proceed to block 88. However, if the received sensor data point does not exceed the threshold, the smart sensor device 62 may return to block 82 and continue to receive the sensor data. At least in some instances, the smart sensor device 62 may transmit an alert or notification to a computing device associated user (e.g., a domain expert) upon detecting an anomaly. The alert may enable a user to provide an input indicating whether or not the detected anomaly corresponds to an actual anomaly, a known condition, and/or whether the smart sensor device 62 should implement different levels of processing discussed in more detail with respect to FIGS. 7, 8, and 9. In general similar manner as described above regard identified operational states, the smart sensor device 62 may output a notification including selectable features to enable a user to provide feedback (e.g., including labels) regarding the identified anomaly.

At block 88, the smart sensor device 62 may determine whether the detected anomaly corresponds to a known condition based on the comparison (e.g., block 86). For example, if the operational parameter associated with the detected anomaly exceeded a threshold corresponding to expected operating conditions the smart sensor device 62 may compare the operational parameter to one or more stored operational parameters associated with known conditions (e.g., a minimum achievable pressure due to a seal of the vacuum being damaged, a conveyor belt speed associated with a pulley being broken). As such, if the operational parameter matches (e.g. is within a threshold range) of a stored operational parameter, the smart sensor device 62 may determine that the detected anomaly (e.g. associated with the operational parameter) corresponds to a known condition. Accordingly, the method 80 may proceed to block 90 and the smart sensor device 62 may take a corrective action, such as by outputting an alert (e.g., block 92) indicating the known condition to the control/monitoring device 48. In some embodiments, the alert may be displayed on a device (e.g., a mobile device, a laptop, a personal computer, or otherwise) associated with a user, such as a manager of the industrial automation system. In some embodiments, the alert may notify a user of a potential anomaly, and request that the user provide feedback to indicate whether or not the sensor data corresponds to an anomaly. As another non-limiting example, the smart sensor device 62 may take the corrective action by sending a command (e.g., block 94) to a controller of an industrial automation component causing the industrial automation component to modify operation (e.g. stopping operation).

However, if the smart sensor device 62 determines that the detected anomaly does not correspond to a known condition (e.g. when the operational parameter does not match any one of the one or more stored operational parameters), the method 80 may proceed to block 96. A block 96, smart sensor device 62 may implement anomaly learning mode, as discussed in more detail with respect to FIG. 7. In general, the anomaly learning mode may include a higher level of processing that enables the smart sensor device 62 to determine an amount of data to transmit to the control/monitoring device 48, such that the control/monitoring device may have a suitable amount of data for batch processing to identify or predict future occurrences of the new anomaly.

Accordingly, the method 80 provides a technique for to programmatically activating the execution of the more complex algorithm based on sensor data acquired by a sensor 16 of a smart sensor device 62 (e.g., whether an identified anomaly corresponds to a known condition). In this way, by selectively activating the more complex algorithm as compared to continuously running the algorithm, the energy usage by the smart sensor device 62 may be decreased and the life expectancy of the sensor device will be extended.

Figure 5:
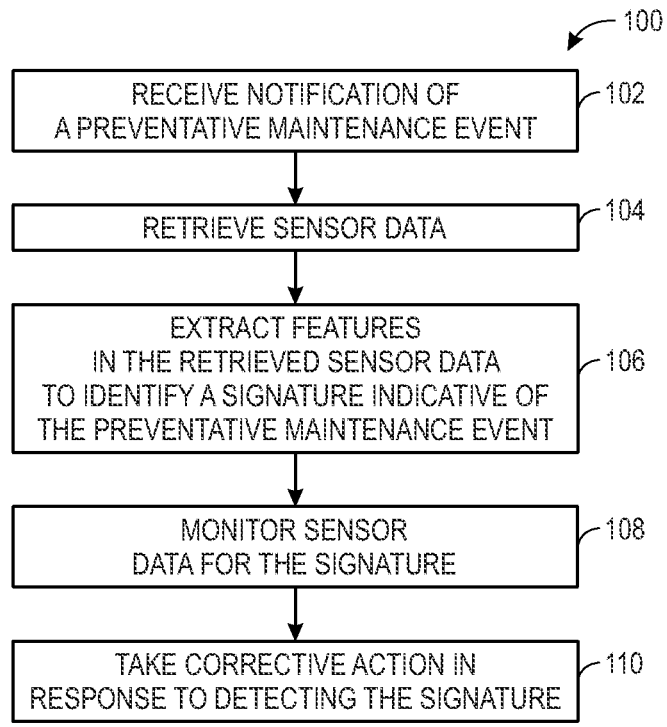
FIG. 5 illustrates a flow chart of a method for toggling between processing modes based on preventative maintenance events, in accordance with an embodiment.

As described herein, the smart sensor device 62 may programmatically activate the execution of algorithms with different complexity levels during preventive maintenance operations. For example, FIG. 5 illustrates a flow chart of a method 100 that may be implemented by the processor of the smart sensor device 62 that may selectively toggle between different operational modes based on a detected preventive maintenance event.

At block 102, the smart sensor device 62 may receive a notification (e.g., via user input, smart tag data) indicating that a preventive maintenance event has occurred or is suspected for an industrial automation equipment. At block 104, the smart sensor device 62 may retrieve sensor data from additional sensors that corresponds to the preventative maintenance event or circumstances. For example, the smart sensor device 62 may identify one or more smart sensor devices 62 that acquired sensor data associated with the industrial automation equipment (this includes current measurements from additional sensors and/or buffered data for some period before the preventative maintenance event, or retrieve historical sensor data that includes previous sensor datasets acquired prior to previous preventive maintenance events. At block 106, the notification of block 102 may trigger an already trained predictive maintenance model or may trigger an automated learning process to create a new model for predictive maintenance operation. The smart sensor device 62 may extract features from retrieved sensor data to identify a signature of the preventative maintenance event. In some embodiments, block 106 may include extracting one or more known signatures for the predictive maintenance event based on a pre-trained model, or may learn optimal features that are best indications of the predictive maintenance event (for example by maximizing the distance between signatures of current event from the signature of normal operation). At block 108, the smart sensor device 62 may monitor sensor data acquired by the sensor(s) of the smart sensor device 62 for the signature. As such, the smart sensor device 62 may detect the signature and take certain measures to perform preventative maintenance. At block 110, the smart sensor device 62 may take a corrective action in response to detecting the signature, such as outputting an alert indicating the time period to perform preventative maintenance.

It should be noted that, at least in some instances, the retrieve sensor data that corresponds to the preventative maintenance event or circumstances (e.g., at block 104), the smart sensor device 62 may train a model to identify feature or trends in sensor data acquired by the sensor of the smart sensor device 62 or additional sensors. In general, the model may be capable of predicting the type of problem, an estimated time period before the problem occurs, and/or a recommendation of actions to take, which may be provided in the alert at block 110. At least in some instances, the model may be trained by a separate device, such as the control/monitoring device 48. As such, the model may be accessible by the smart sensor device 62, whether stored locally on the memory 68 or accessible via a cloud storage.

In this way, the smart sensor device 62 may programmatically activate a more complex operation (e.g., identifying the signature indicative of the preventative maintenance event) based on a received notification of a preventative maintenance event. Moreover, the smart sensor device 62 may operate in a lower processing mode while monitoring the sensor data for the signature. By performing the operations of method 100 on the smart sensor device 62, the smart sensor device 62 may defer some of the processing operations traditionally performed via devices connected to the smart sensor device 62, such as the control/monitoring system 48.

Figure 6:
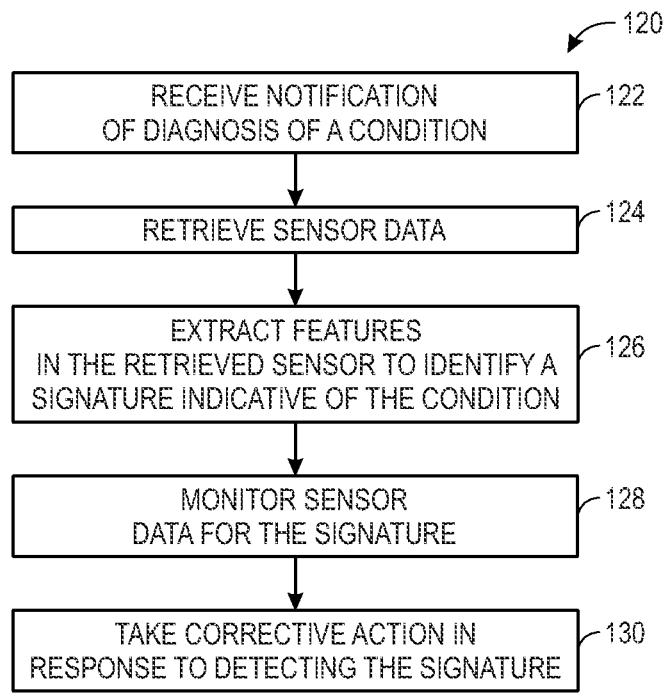
FIG. 6 illustrates a flow chart of a method for toggling between processing modes based on a diagnosed condition, in accordance with an embodiment.

As another non-limiting example of programmatically activating a more complex operational mode, FIG. 6 illustrates a flow chart of a method 120 that may be implemented by the processor of the smart sensor device that may selectively toggle between different operational modes based on a diagnosed condition. By performing the method described below, the smart sensor device 62 may selectively activate different operational modes during diagnostic operations.

At block 122, the smart sensor device 62 may receive a notification (e.g., via user input, smart data tag) indicating a diagnosed condition of an industrial automation equipment. At block 124, the smart sensor device 62 may retrieve sensor data from additional sensors that corresponds to the diagnosed condition or circumstances. For example, the smart sensor device 62 may identify one or more smart sensor devices 62 or sensors 16 that measured sensor data of the industrial automation equipment in a time period before the condition was diagnosed and retrieve sensor data (e.g., historical sensor data) that includes previous sensor datasets acquired prior to and a previous diagnosed condition. At block 126, the smart sensor device 62 may extract features from the retrieved sensor data to identify a signature indicating the diagnosed condition. At block 128, the smart sensor device 62 may monitor sensor data for the signature. At block 130, the smart sensor device 62 may take a corrective action in response to detecting the signature.

In this way, the smart sensor device 62 may programmatically activate a more complex operation (e.g., identifying the signature indicative of the diagnosed condition) based on a received notification of a preventative maintenance event. By performing the operations of method 120 on the smart sensor device 62, the smart sensor device 62 may defer some of the processing operations traditionally performed via devices connected to the smart sensor device 62.

Additionally, in some embodiments, the smart sensor device 62 may utilize trends associated with a type of sensor data and a type of industrial automation equipment associated with the smart sensor device 62. For example, at block 126, the smart sensor device 62 may determine that the retrieved sensor data includes vibrational data and/or is related to an industrial automation equipment that includes bearings. As such, the smart sensor device 62 may retrieve trend information associated with vibrational data that indicates whether a bearing is gradually loosening (e.g., the trend may indicate that an increasing amplitude over time in vibration data is correlated with the loosening of the bearing). The smart sensor device 62 may utilize the trend as the signature to identify a time period for performing preventive maintenance to address the loosening of a bearing by determining whether the sensor data fits the trend.

The anomaly learning mode may include a suitable level of processing to enable the smart sensor device 62 to determine an amount of sensor data to transmit to the control/monitoring device 48 such that the control/monitoring device 48 may have a suitable amount of data to identify or predict future occurrences of the new anomaly. For example, implementing the anomaly learning mode may cause the smart sensor device 62 to determine expected times in which the new anomaly may occur (e.g., a frequency of the new anomaly), and transmit sensor data according to the expected times, such as by transmitting a predetermined amount of data before, during, or after a period in time corresponding to an expected occurrence of the anomaly.

Figure 7:
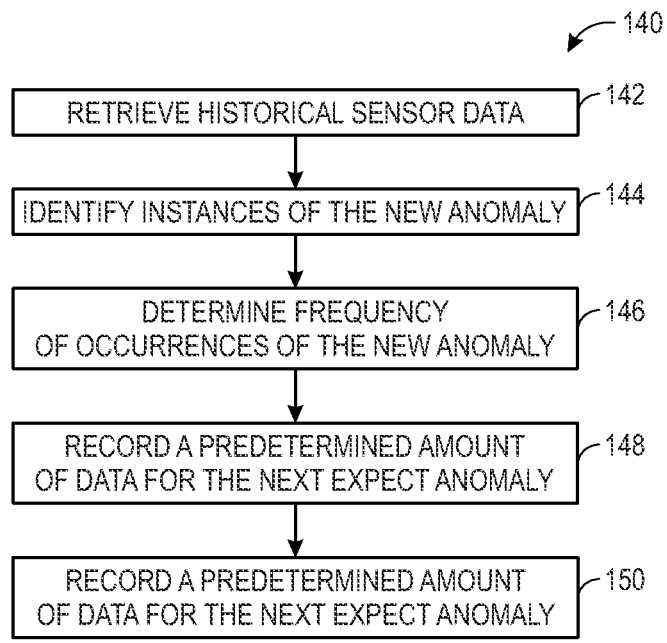
FIG. 7 illustrates a flow chart of a method for transmitting sensor data in accordance with a determined frequency to control operation of the smart sensors monitoring parameters of the industrial automation system, in accordance with an embodiment.

To further explain this, FIG. 7 illustrates a flowchart of a method 140 that may be implemented by a processor of the smart sensor device 62 to determine a frequency at which to transmit sensor data such that the transmitted data corresponds to an expected occurrence of the anomaly. Although the method 140 is described as being performed by the processor 66 of the smart sensor device 62, it should be noted that any suitable computer device capable of communicating with other components in the industrial automation system 10 may perform the disclosed method 80 including, but not limited to, the cloud-based computing system 60, the computing device 58, and the like.

However, it should be noted that employing the method 140 described below in the smart sensor device 62, the control and monitoring system 44, the cloud-based computing system 60, the computing device 58, and other computing devices connected to the smart sensor device 62 may transmit data or analyzed data in a controlled or limited manner. That is, the present embodiments described herein defer some processing operations traditionally performed via devices connected to the smart sensor device 62. As a result, the smart sensor device 62 may communicate data less frequently than previous methodologies in which the connected devices receive data from sensors at regular intervals and perform more processing operations for analyzing the collected data, while the sensors lack or have limited processing capabilities. Furthermore, by performing the methods described below, the present embodiments enable the smart sensor 62 to identify times to transmit sensor data associated with the anomaly, thereby providing the control/monitoring system 48 with less volumes of sensor data to process and more relevant sensor data that may be useful for identifying a cause or an appropriate control action to implement based on the new anomaly. Moreover, while the method 140 is described in the context of anomaly detection, it should be understood that the method 140 may be applied to preventative maintenance operations, diagnostics, and sensor validation.

At block 142, the smart sensor device 62 may retrieve historical sensor data, such as sensor data previously acquired by the smart sensor device. At least in some instances, the smart sensor device 62 may record and or store information (e.g., the historical data) associated with occurrences potentially new anomalies in the memory 68 or storage 70 of the smart sensor device 62. As such, after implementing the anomaly learning mode, the smart sensor device 62 may retrieve information associated with one or more occurrences of previously identified anomalies.

At block 144, the smart sensor device 62 may identify instances of the new anomaly based on data acquired by the smart sensor device 62. In general, the smart sensor device 62 may compare the sensor data used to detect the new anomaly (e.g., in block 86 of method 80 described in FIG. 4) to the historical data. In some embodiments, the smart sensor device 62 may monitor sensor data acquired by these sensors 16 of the smart sensor device 62 after detecting the new anomaly and predict a subsequent occurrence of the anomaly.

At block 146, the smart sensor device 62 may determine a frequency of similar anomalies based on the historical data. Continuing with the example above, if the smart sensor device 62 identifies a new occurrence of the anomaly, the smart sensor device 62 may identify a time period between the multiple occurrences of the similar anomalies. The time period may indicate an expected frequency of occurrence for a new anomaly.

At block 148, the smart sensor device 62 may record a predetermined amount of data during a time period that corresponds to the next expected anomaly. That is, using the expected frequency of occurrence of the new anomaly, the smart sensor device 62 may predict an approximate time for the next occurring anomaly and collect data from the sensors 16 for a certain amount of time prior to and after the expected occurrence. In other words, the frequency for the new anomaly may indicate the next expected occurrence of new anomaly or a similar anomaly. As such, the smart sensor device 62 may record data before, during, and/or after the next expected anomaly. At least in some instances, the predetermined amount of data may be specified by a domain expert (e.g., provided as input by the domain expert and stored on the memory 68 of the smart sensor device 62).

At block 150, the smart sensor device 62 may transmit the recorded data to another computing component, such as the control/monitoring device 48. For example, the smart sensor device 62 may transmit the recorded data to a computing component having relatively more processing capabilities, and thus, more suitable for identifying trends or patterns in the recorded data that may be used to identify a cause of the anomaly. At least in some instances, the smart sensor device 62 may transmit the expected frequency determined at block 106 or expected times to one or more additional smart sensor devices 62 that, in turn, may record sensor data at intervals specified by the frequency. For example, each smart sensor device 62 may store a smart tag in their respective memories 68 that identifies a type of equipment or a task performed by the equipment. As such, the smart sensor device 62 may transmit the frequency to additional smart sensor devices 62 that acquire sensor data associated with similar types of equipment or perform similar tasks. The additional smart sensor devices 62 may each record a predetermined amount of data based on the expected frequency and transmit the predetermined amount of data to another computing component, such as the control/monitoring device 48. In this way, the control/monitoring device 48 may have a suitable amount of data to identify a cause and/or corrective action to implement based on the new anomaly.

With this in mind, the method 140 provides a suitable processing level for identifying an amount of data (e.g., the amount of data recorded at the identified frequency over a time period) that may be used by another computing component. In this way, the method 140 enables the smart sensor device 62 to scale or limit the amount of data processed by the other computing component, such as the control/monitoring device 48 such that the control/monitoring device 48 is processing data that is relevant to the new anomaly.

As discussed above, the smart sensor device 62 may implement the anomaly learning mode to identify a frequency associated with an occurrence of a new anomaly. Additionally, the identified frequency may be transmitted to the control/monitoring device 48. At least in some instances, one or more additional smart sensor devices 62 may be detecting operational parameters of the same equipment as the smart sensor device 62 that identified the frequency and/or may be detecting operational parameters of equipment nearby. Accordingly, and as discussed in further detail below, it may be advantageous to utilize a combination of the sensor data measured by the one or more additional smart sensor devices 62 and the sensor data measured by the smart sensor device 62 to identify future occurrences of the anomaly or causes of the anomaly. However, at least in some instance, the amount of data generated by the sensor devices 62 (e.g., the sensor device 62 and the one or more additional smart sensor devices) may be larger than suitable. That is, there may be a reduced set of the sensor data acquired by the multiple sensor devices 62 that is suitable for representing the new anomaly.

Figure 8:
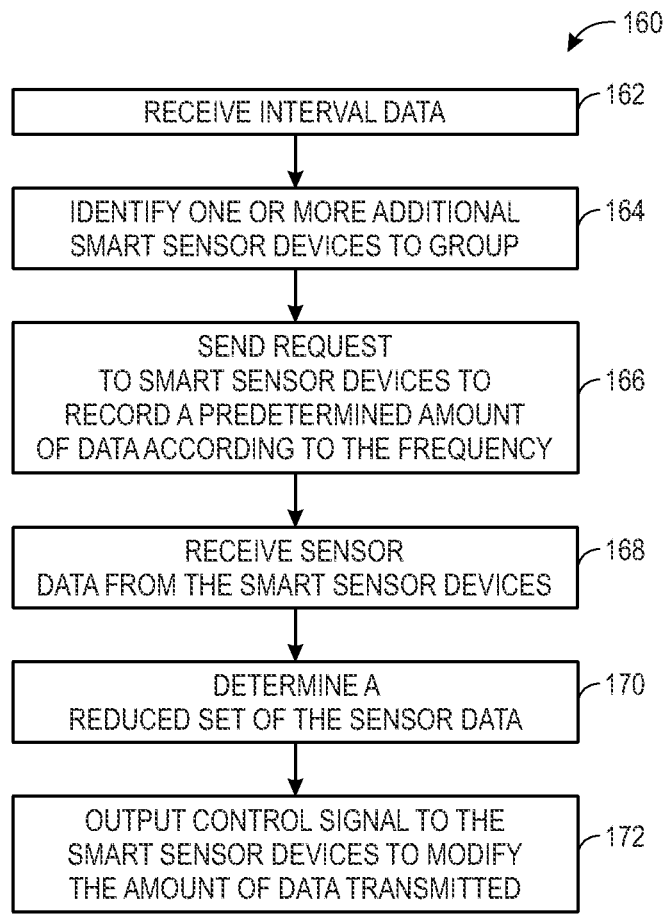
FIG. 8 illustrates a flow chart of a method for generating a reduced set of sensor data, in accordance with an embodiment.

To illustrate this, FIG. 8 illustrates a flow chart of a method 160 for determining a reduced set of data transmitted by multiple smart sensor devices 62. Although the method 160 described as being performed by the control/monitoring system 48, it should be noted that any suitable computer device capable of communicating with other components in the industrial automation system 10 may perform the disclosed method 160 including, but not limited to, the cloud-based computing system 60, the computing device 58, and the like. However, it should be noted that employing the method 120 described below in the smart sensor device 62, the control/monitoring system 48, the cloud-based computing system 60, the computing device 58, and other computing devices connected to the smart sensor device 62 may transmit data or analyzed data in a controlled or limited manner. By performing the methods described below, the present embodiments reduce the amount of smart sensor devices 62 transmitting data and/or the amount of data transmitted by the smart sensor devices 62, thereby reducing the amount of data to be processed by the control/monitoring system 48 and increasing the lifetime of the smart sensor devices 62 and network bandwidth availability of the respective network.

At block 162, the control/monitoring system 48 may receive interval data. The interval data may be indicative of the frequency of the new anomaly and/or an amount of data suitable for operations performed by the control/monitoring system 48. In some embodiments, the interval data may be transmitted by the smart sensor device 62 and received by the control/monitoring system 48.

At block 164, the control/monitoring system 48 may identify one or more additional smart sensor devices 62 to detect operational parameters according to the frequency. In some embodiments, the multiple smart sensor devices 62 may include an embedded intelligence within a group of sensor smart devices 62. For example, each sensor may be equipped with a "smart tag" data structure where application context information is captured. For example, the context information may be GPS coordinates that can be transmitted with sensor reading allowing the recipient to construct a digital twin of the sensory network automatically. In any case, the control/monitoring system 48 may identify a group of smart sensors devices 62 that are measuring data of a similar industrial automation component. For example, the smart tag may indicate a location associated with the smart sensor devices 62 may be approximately the same, and thus the smart sensor devices 62 should be grouped.

At block 166, the control/monitoring system 48 may send a request to the smart sensor devices 62 to record a predetermined amount of data according to the frequency. That is, the control/monitoring system 48 may transmit a command that causes the smart sensor devices 62 to record a predetermined amount of data at intervals specified by the frequency. For example, the command may instruct the smart sensor devices 62 to record a predetermined amount of data beginning every 1 minute, 5 minutes, 10 minutes, 1 hour, 1 day, 1 week, for a predetermined amount of time.

At block 168, the smart sensor device 62 may receive sensor data from multiple sensors. In general, the smart sensor device 62 may receive streamed sensor data from one or more additional sensors via respective communication component 64 of the smart sensor device 62. At block 170, the control/monitoring device 48 may determine a reduced set of sensor data based on the received sensor data from multiple sensors. In general, the reduced set of sensor data has a relatively smaller memory footprint than all the received sensor data, while it still includes a suitable amount of data for enabling the control/monitoring system 48 or other suitable device to identify future occurrences of the anomaly within a predetermine level of accuracy or precision. For example, the smart sensor device 62 may determine a linear, or nonlinear, combination of the sensor data acquired by the multiple sensors having a predetermined level of accuracy (e.g., greater than 50%, 70%, 80%, 90%, 95%, 99%). As another non-limiting example, the reduced set of data may be a lower dimensional space than the combination of all the received sensor data.

At block 172, the smart sensor device(s) 62 may output a control signal to the smart sensor devices 62 to modify the amount of data transmitted by the smart sensor devices 62. In general, modifying the amount of data transmitted by the smart sensor devices 62 may include instructing a portion of the smart sensor devices 62 to stop transmitting data, transmit less data during each interval associated with the frequency. In some embodiments, the memory 68 of the smart sensor device 62 may store instructions to transmit the sensor data according to control signal. That is, after the processor 66 has received the control signal to modify the amount of data transmitted, the processor 66 may continue to transmit sensor data according to the instructions.

In this manner, the process 160 may enable the smart sensor device 62 to limit the data transmitted to the computing device, thereby reducing the amount of data processed by the control/monitoring device 48. Moreover, by reducing the amount of data transmitted by the smart sensor devices 62, the amount of energy used by the smart sensor devices 62 may be decreased thereby increasing the lifetime of the smart sensor devices 62.

As generally discussed above, the smart sensor devices 62 may defer some processing operations traditionally performed via devices connected to the smart sensor device 62, such as the control/monitoring system 48. For example, as discussed above with respect to FIG. 4, the smart sensor devices may be capable of toggling different operational modes of the smart sensor devices 62 based on a comparison between received sensor data and a constraint. As generally discussed above in FIG. 4, the constraint may include thresholds, threshold ranges, or operational parameters indicating expected operational parameters.

Figure 9:
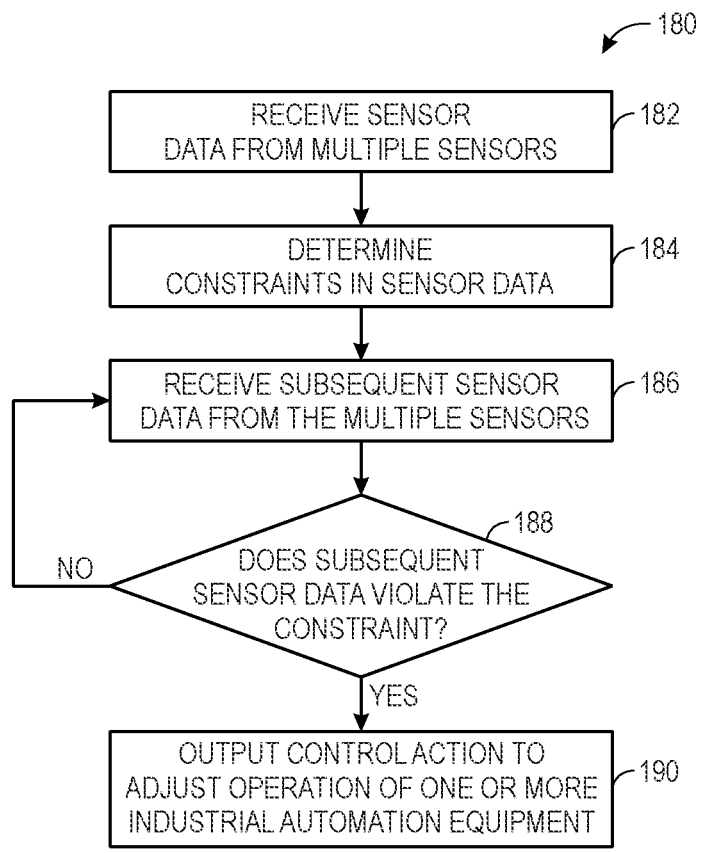
FIG. 9 illustrates a flow chart of a method for determining constraints and validating streamed sensor data against the constraints, in accordance with an embodiment.

In general, FIG. 9 illustrates a flow chart of a method 180 for determining a constraint in the sensor data that may be used in conjunction with the process 80 of FIG. 4. Accordingly, the smart sensor device 62 may use the determined constraint to detect an anomaly, such as by comparing received sensor data to the constraint. Although the method 180 is described as being performed by the processor 66 of the smart sensor device 62, it should be noted that any suitable computer device capable of communicating with other components in the industrial automation system 10 may perform the disclosed method 180 including, but not limited to, the cloud-based computing system 60, the computing device 58, and the like. By performing the methods described below, the present embodiments reduce the amount of data processed by the control/monitoring system 48, thereby freeing up the memory of the control/monitoring system 48 for different processing operations.

At block 182, the smart sensor device 62 may receive sensor data from multiple sensors. In some embodiments, the smart sensor devices 62 may receive the sensor data from a group of smart sensor devices, where the group is identified in a similar manner as discussed with respect to step 124 of process 120. At block 184, the smart sensor device 62 may determine constraints in the sensor data. In general, the constraint may be a mathematical relationship between sensor data from multiple sensors. In some embodiments, each smart sensor devices 62 may determine a respective constraint to use to determine whether there is anomaly or change in the measured sensor data.

At block 186, the smart sensor device 62 may receive subsequent sensor data from the multiple sensors in a general manner as discussed herein. For example, the smart sensor device 62 may receive streamed sensor data from one or more additional smart sensor devices 62 that are grouped with the smart sensor device 62. At block 188, the smart sensor device 62 may determine whether the subsequent sensor data violates the constraint. For example, the smart sensor device 62 may determine whether the sensor data detected by the multiple smart sensor devices 62 (e.g., the smart sensor device 62 and one or more additional smart sensor devices 62) is within a threshold range of the relationship indicated by the constraint. If the sensor data does not violate the constraint (i.e., there is no discrepancy between the constraint and the mathematical relationship between the sensor data detected by the multiple sensors), the process 180 may return to block 186 and receive subsequent sensor data.

However, if the sensor data does violate a constraint, at block 190, the smart sensor device 62 may output a control action that may be similar to steps 90, 92, 94, and 96 as discussed above with respect to FIG. 4. For example, the control action may include toggling between operational modes of the smart sensor device 62 or taking a corrective action, such as outputting an alert or a command. For example, the alert may be displayed on a dashboard or display of a computing device of a user.

As one non-limiting example of an implementation of the process 180, the industrial automation system 10 may include four smart sensor devices 62 that each have flow meters, which, in total, measure a sum of flow from four pumps leaving a common header. Each smart sensor device 62 may determine a constraint that may be a mathematical relationship between the sensor data measured by the smart sensor device 62 and the sensor data streamed to the smart sensor device 62 by the additional smart sensor devices 62. Accordingly, when the sensor data measured by the smart sensor device 62 violates the constraint (e.g., is outside of a threshold defined by the constraint), the smart sensor device 62 may output a control signal that may cause one or more equipment to halt or modify operation.

As another non-limiting example of the implementation of the process 180, the process 180 may be used for sensor validation. For example, and in a generally similar manner as described above, the constraint that may be a mathematical relationship between the sensor data measured by the smart sensor device 62 and the sensor data streamed to the smart sensor device 62 by the additional smart sensor devices 62. Accordingly, when the smart sensor device 62 identifies a discrepancy between sensor data received by the smart sensor device 62, the smart sensor device 62 may determine that the discrepancy is associated with sensor data acquired by at least one of the sensors. As such, the smart sensor device 62 may identify the at least one sensor and determine whether the at least one sensor is operating properly, such as by determining whether the smart sensor device 62 received data from the at least one sensor, whether the sensor data acquired by the at least one sensor is outside of an expected range (e.g., indicating that the sensor may have malfunctioned and/or needs calibrating).

In this manner, the process 180 may enable smart sensor devices 62 to determine a constraint used for detecting anomalies within the industrial automation system 10. For example, the process 180 may enable a smart sensor to automatically determine a relationship (e.g., mathematical relationship) to use as a constraint for verifying sensor data and the operation of sensors. By deferring the process 180 to being performed by the smart sensor devices 62, processing operations performed by an external computing device, such as the control/monitoring device 48 may be reduced, thereby freeing up memory for performing processing operations such as model predictive control. Additionally, the constraint determined by the smart sensor device 62 may improve capability of the smart sensor device 62 to disregard measurement noise or reduce the likelihood of the smart sensor device 62 incorrectly attributing measurement noise to a condition or anomaly.

Accordingly, the present disclosure relates to smart sensor devices that defer certain processing capabilities performed by computing devices to reduce energy consumption and increase the lifetime of the computing devices and/or the smart sensor device. For example, the disclosed techniques relate to a smart sensor device 62 capable of toggling between different operational modes that correspond to different levels of processing. For example, one operational mode may be an anomaly learning mode that enables the smart sensor device 62 to identify when to transmit data (e.g., a frequency) to be used in identifying anomalies. The control/monitoring device 48 may transmit the frequency to additional smart sensor devices 62, causing the additional smart sensor devices 62 to also transmit data according to the frequency. Further still, the control/monitoring device 48 may determine a reduced set of data that is representative of the data acquired by the additional smart sensor devices 62 and output a control signal causing the smart sensor devices 62 to modify an amount of data transmitted by the additional smart sensor devices. Even further, the smart sensor devices 62 may be capable of determining a constraint used to detecting anomalies based on operational parameters measured by and streamed from smart sensor devices 62 that are grouped with the smart sensor device 62.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the embodiments described herein have been illustrated and described, many modifications and changes will occur to those skilled in the art. It is, therefore, to be understood that the appended claims are intended to cover all such modifications and changes as fall within the true spirit of the embodiments described herein

The invention claimed is:

1. A sensor device, comprising:
 a sensor configured to measure sensor data indicating an operational parameter of industrial automation equipment associated with an industrial automation process;
 communication circuitry configured to transmit the sensor data;
 a processor configured to receive the sensor data; and
 a non-transitory computer-readable medium comprising computer-executable instructions that, when executed, are configured to cause the processor to perform operations comprising:
  determining an expected operational state of the industrial automation equipment based on a first set of sensor data acquired by the sensor;
  receiving a second set of sensor data after determining the expected operational state;
  detecting an anomaly based on the second set of sensor data and the expected operational state; and
  modifying an operation of the processor from a first operational mode to a second operational mode of a plurality of operational modes based on the detected anomaly, wherein the processor operating in accordance with the second operational mode comprises generating a model based on the anomaly and the second set of data, and wherein the model is configured to identify a portion of the second set of sensor data corresponding to the anomaly.

2. The sensor device of claim 1, wherein the non-transitory computer-readable medium comprising computer-executable instructions are configured to identify the expected operational state of the industrial automation equipment by determining a root mean square (RMS) of the sensor data, determining a standard deviation of the sensor data, clustering the sensor data, or any combination thereof.

3. The sensor device of claim 1, wherein the non-transitory computer-readable medium comprising computer-executable instructions are configured to toggle from the first operational mode to the second operational mode causes the processor to modify an amount of data transmitted by the communication circuitry.

4. The sensor device of claim 1, wherein the non-transitory computer-readable medium comprising computer-executable instructions configured to cause the processor to operate according to the second operational mode comprise:
determining an expected time for an additional occurrence of the anomaly
identifying a time interval associated with the expected time;
record a portion of data acquired by the sensor based on the time interval; and
transmit the portion of data to a control system.

5. The sensor device of claim 1, wherein the instructions that, when executed, are configured to cause the processor to:
receive a time interval for transmitting sensor data from a control system; and
control operation of the communication circuitry to transmit the sensor data based on the time interval.

6. The sensor device of claim 1, wherein the communication circuitry, the processor, and the sensor are enclosed within a housing.

7. The sensor device of claim 1, wherein the non-transitory computer-readable medium comprising computer-executable instructions are configured to cause the processor to perform the operations comprising:
receive additional sensor data indicating an additional operational parameter measured by an additional sensor;
wherein the operational state comprises a constraint; and
determine the constraint based on the sensor data and the additional sensor data, wherein the constraint is determined based on a mathematical relationship between the sensor data and the additional sensor data.

8. The sensor device of claim 1, wherein a memory component storing the operational state is locally accessible to the processor.

9. The sensor device of claim 1, comprising a control system, wherein the control system is configured to:
receive the sensor data transmitted by the communication circuitry; and
output a control signal causing the processor to modify an amount of data measured by the sensor.

10. The sensor device of claim 1, wherein the model is configured to determine a control action based on the anomaly.

11. A non-transitory computer-readable medium comprising computer-executable instructions that, when executed, are configured to cause a processor to perform operations comprising:

receiving a first set of sensor data indicating an operational parameter of industrial automation equipment associated with an industrial automation process;
determining an expected operational state of the industrial automation equipment based on the first set of sensor data;
receiving a second set of sensor data after determining the expected operational state;
detecting an anomaly based on the second set of sensor data and the expected operational state associated with the industrial automation equipment; and
modifying an operation of the processor from a first operational mode to a second operational mode of a plurality of operational modes based on the detected anomaly, wherein the processor operating in accordance with the second operational mode comprises generating a model based on the anomaly and the second set of sensor data, and wherein the model is configured to identify a portion of the second set of sensor data corresponding to the anomaly.

12. The non-transitory computer-readable medium of claim 11, wherein the computer-executable instructions that, when executed, are configured to cause the processor to:
receive a time interval for transmitting sensor data from a control system; and
transmitting the sensor data based on the time interval.

13. The non-transitory computer-readable medium of claim 11, wherein the sensor data is acquired by a plurality of sensors, and wherein the computer-executable instructions that, when executed, are configured to cause the processor to modify the operation comprise outputting an alert indicating that an error in the operation of a first sensor of the plurality of sensors.

14. The non-transitory computer-readable medium of claim 11, wherein the computer-executable instructions that, when executed, are configured to cause the processor to operate according to the second operational mode comprise:
receiving additional sensor data;
determining an expected time for an additional occurrence of the anomaly based on the additional sensor data;
identifying a time interval associated with the expected time;
recording a portion of data acquired by the sensor based on the time interval; and
transmitting the portion of data to a control system.

15. The non-transitory computer-readable medium of claim 11, wherein the computer-executable instructions that, when executed, are configured to cause the processor to modify the operation of the processor comprise:
outputting a control signal to a sensor measuring the sensor data to cause the sensor to modify an amount of data measured by the sensor.

16. The non-transitory computer-readable medium of claim 11, wherein computer-executable instructions that, when executed, are configured to cause the processor to operate according to the second operational mode comprise determining a label for a new operational state based on the anomaly.

17. A method, comprising:
receiving, via one or more processors, a first set of sensor data indicating an operational parameter of industrial automation equipment associated with an industrial automation process;
determining, via the one or more processors, an expected operational state of the industrial automation equipment based on the first set of sensor data;

receiving, via the one or more processors, a second set of sensor data after determining the expected operational state;

detecting, via the one or more processors, an anomaly based on the second set of sensor data and the expected operational state; and modifying, via the one or more processors, an operation of the one or more processors from a first operational mode to a second operational mode of a plurality of operational modes based on the detected anomaly, wherein the one or more processors operating in accordance with the second operational mode comprises generating a model based on the anomaly and the second set of sensor data, and wherein the model is configured to detect a preventative maintenance operation based on the second set of data.

18. The method of claim 17, comprising:

receiving, via the one or more processors, additional sensor data indicating an additional operational parameter measured by an additional sensor; and wherein the operational state comprises a constraint; and determining, via the one or more processors, the constraint based on the sensor data and the additional sensor data, wherein the constraint is determined based on a mathematical relationship between the sensor data and the additional sensor data.

* * * * *